United States Patent [19]

Miyamatsu et al.

[11] 3,999,494
[45] Dec. 28, 1976

[54] METHOD AND APPARATUS FOR FORMING OPENINGS IN A CAN END AND APPLYING A SEALANT TO THE INSIDE SURFACES OF THE OPENINGS

[75] Inventors: Yasunori Miyamatsu; Kikuo Kawamukai, both of Yokohama, Japan

[73] Assignee: Toyo Seikan Kaisha Limited, Tokyo, Japan

[22] Filed: May 30, 1975

[21] Appl. No.: 582,439

[30] Foreign Application Priority Data

Aug. 23, 1974 Japan .............................. 49-96182

[52] U.S. Cl. .............................. 113/1 F; 113/15 R; 113/80 D; 113/116 H; 113/121 C
[51] Int. Cl.² ........................................ B21D 51/00
[58] Field of Search ................. 113/1 F, 1 G, 15 R, 113/15 A, 121 C, 121 R, 121 A, 116 H, 80 C, 80 R, 80 DA, 80 BA

[56] References Cited

UNITED STATES PATENTS

| | | | |
|---|---|---|---|
| 2,282,959 | 5/1942 | Gibbs | 113/80 |
| 3,328,873 | 4/1967 | Schweers | 113/80 D |
| 3,425,590 | 2/1969 | Cook | 113/121 C |
| 3,759,206 | 9/1973 | Dalli | 113/121 C |
| 3,870,001 | 3/1975 | Brown | 113/121 C |
| 3,881,437 | 5/1975 | Lovell | 113/121 C |
| 3,888,199 | 6/1975 | Herrmann | 113/80 R |

*Primary Examiner*—C.W. Lanham
*Assistant Examiner*—Gene P. Crosby
*Attorney, Agent, or Firm*—Diller, Brown, Ramik & Wight

[57] ABSTRACT

A press-forming operation to form opening portions in can ends having a curled portion for seaming and an operation of applying a sealant on the opening portions have been coupled into an integrated system, thus allowing them to be performed consecutively. Can ends are supported at predetermined intervals by a can end-supporting disc so as to move them intermittently.

4 Claims, 14 Drawing Figures

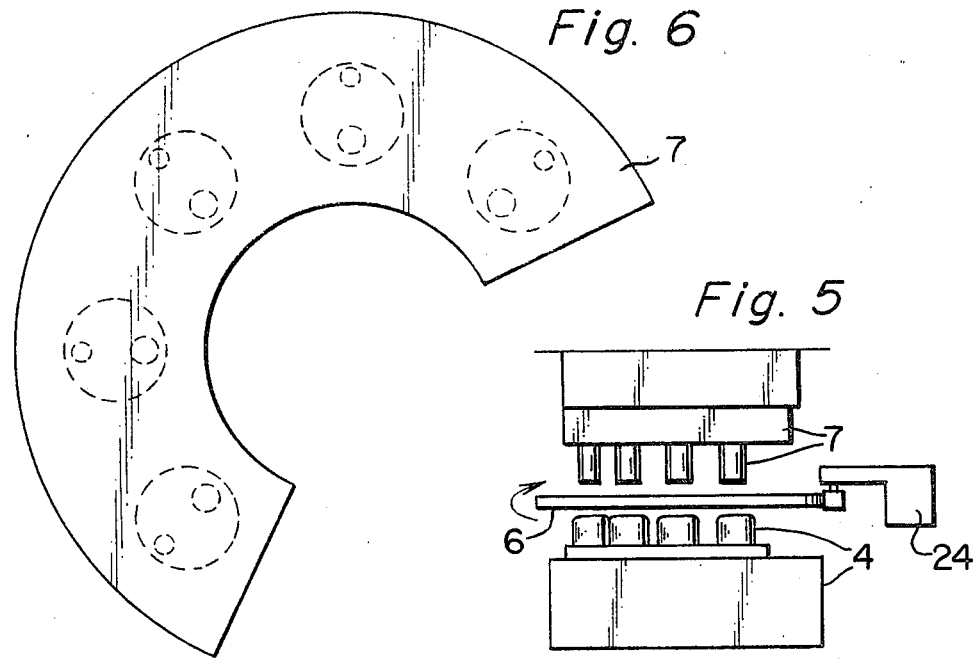
Fig. 6
Fig. 5
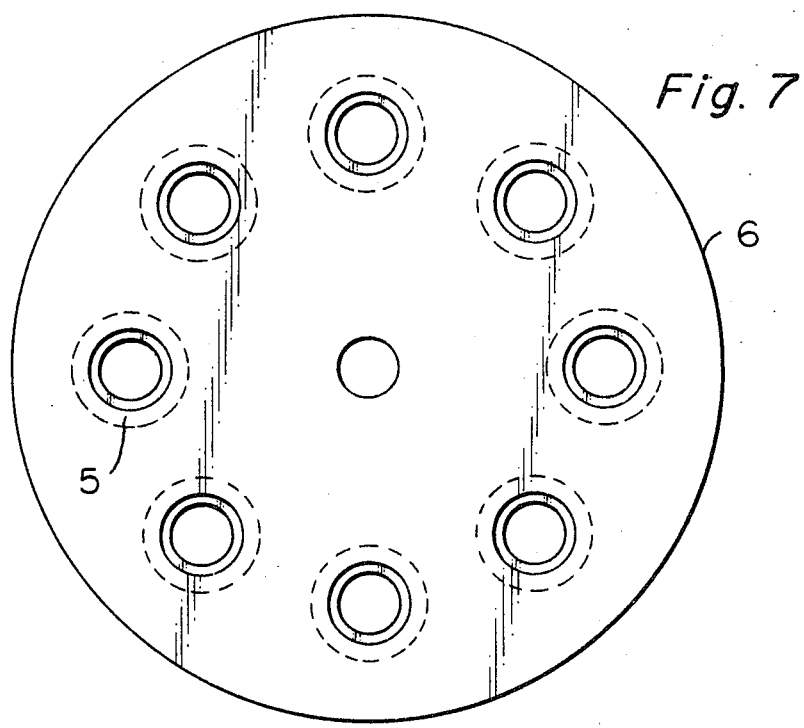
Fig. 7

METHOD AND APPARATUS FOR FORMING OPENINGS IN A CAN END AND APPLYING A SEALANT TO THE INSIDE SURFACES OF THE OPENINGS

This invention relates to the manufacture of can ends having a curled portion for seaming and opening portions whose inside peripheral edtes are coated with a sealant.

Can ends having such opening portions have already been known, and many can bodies containing such ends have found practical utility. The opening portions can be easily opened by, for example, pushing them with a finger tip, and the contents can be taken out. Such can ends are processed in the following manner prior to seaming. A greater part of the opening portions is sheared, and in order to reinforce the sheared portion, a sealant is applied to the inside periphery of the opening portions. If a sealant containing suitable components is coated, the opening portion can somewhat withstand pressures applied externally and internally of the can, and serves to prevent the leakage of the contents. Past experience fully confirms the feasibility of can ends having such opening portions. However, the conventional operation of applying a sealant to the inside surfaces of the opening portions of can ends suffers from low working efficiency, and the output obtainable with the conventional technique is as low as about 75 pieces per minute at most.

In recent years, there has been a marked advance in the technique of applying a sealant to the inner surfaces of can end opening portions, and the working efficiency has greatly increased. This advanced technique has been coupled with a press-forming operation of providing openings in can ends.

In the past, a can end having opening portions was prepared by press-forming, and at another place, a sealant was applied to the opening portions. In this case, the position of the can end must be adjusted so as to suit an apparatus for applying the sealant. Not only does this require much time, but also inaccuracy tends to occur in the position of applying the sealant.

In the present invention, a can end-supporting disc having holes at predetermined intervals is used. A can end moves while being supported by the can end-supporting disc, and arrives at a sealant-applying worktable after going through several press-forming worktables. Since the can end is supported in position during this process, it is not necessary to correct the position of the can end as is the case with the conventional technique. Inaccuracy neither occurs in the position of applying the sealant by a stamping die.

It is an object of this invention to increase the productivity of making can ends with opening portions by coupling a press-forming operation of making the openings and an operation of applying a sealant on the opening portions into an integrated sytem and performing the press-forming operation and the sealant-applying operation by a synchronizing drive means.

Another object of this invention is to provide stable can bodies by applying a sealant accurately to a predetermined position of the inside surface of a can end opening portion.

The present invention will be described in detail below by reference to the accompanying drawings in which:

FIG. 5 is a schematic side elevation of an apparatus in accordance with this invention;

FIG. 6 is a top plan of an upper press member;

FIG. 7 is a top plan of a can end-supporting disc;

Figure 4:
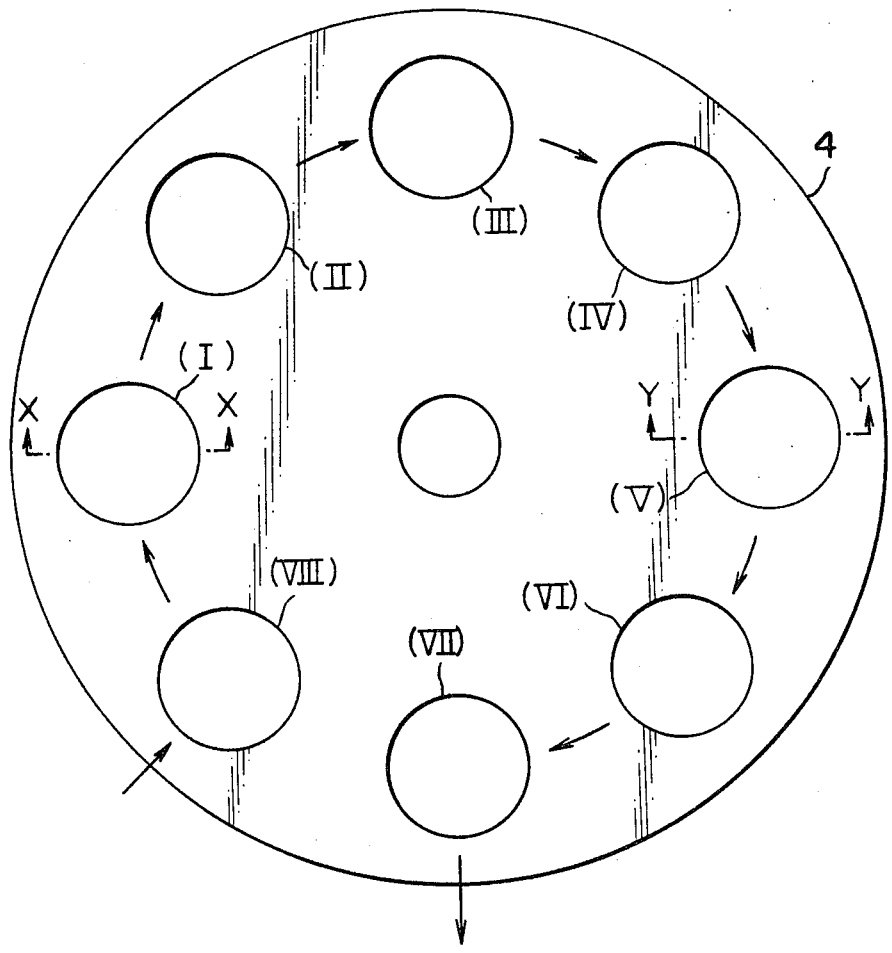
FIG. 4 is a top plan of a base stand having worktables thereon in accordance with an embodiment of this invention.
Figure 9A:
Figure 9B:
Figure 9C:
Figure 9D:
Figure 9E:
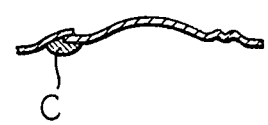
Figure 10:
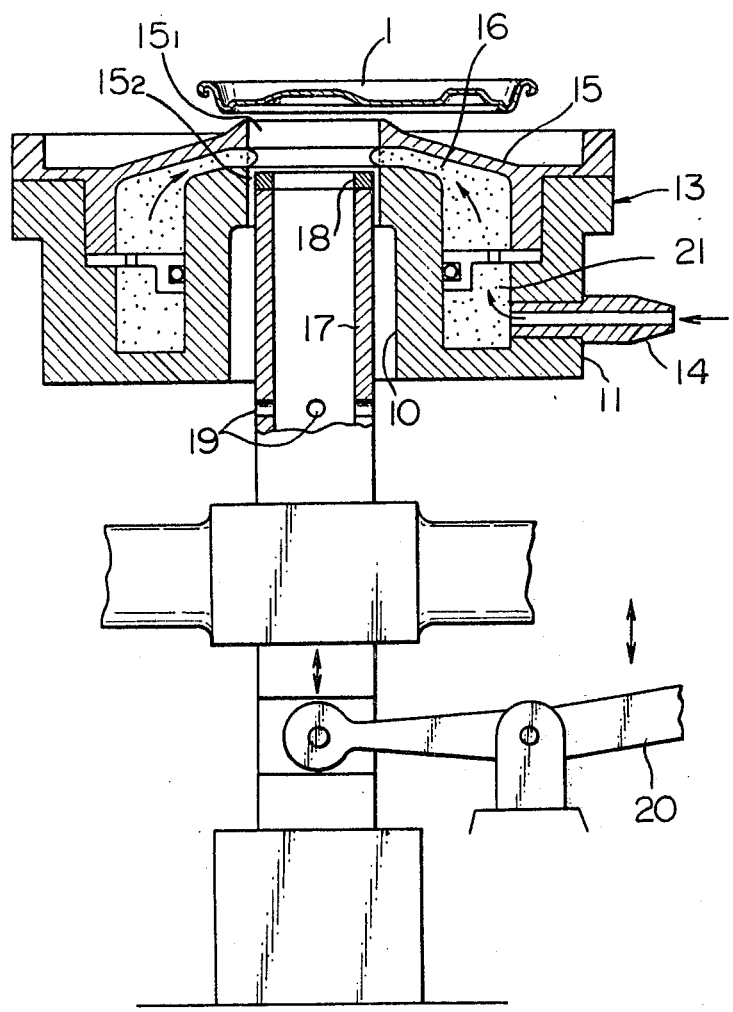

FIGS. 9a, 9b, 9c, 9d, and 9e are enlarged fragmentary sectional views of the opening portion of a can end showing the sequential formation thereof by a press-forming technique; and FIG. 10 is a side elevation in vertical section taken along the line Y—Y of a worktable (V) shown in FIG. 4 for applying a sealant.

Figure 1:
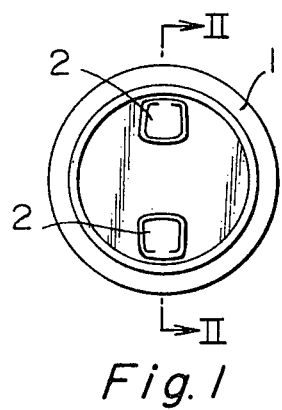
FIGS. 1, 2 and 3 are views showing the shapes of an ordinary can end having opening portions, FIG. 1 being a top plan view, FIG. 2 being a sectional view taken along the line II—II of FIG. 1, and FIG. 3 being an enlarged fragmentary plan view of a part of the can end.
Figure 2:
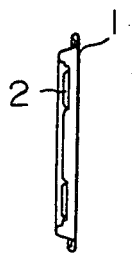
Figure 3:
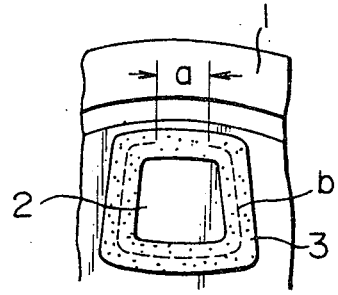

An example of the opening portion of a can end is shown in FIGS. 1, 2 and 3. One or two opening portions 2 are provided in a can end 1. When the opening portions 2 are pushed from outside, they can be easily opened. In other words, the opening portions have a sheared portion, and are broken at this part. In FIG. 3, the dotted line $b$ represents the sheared portion, and the solid line $a$ shows a non-sheared part. The sheared portion is required to be reinforced from its back by applying a sealant 3. This state is shown by dots in FIG. 3. The sealant 3 is applied so that it overrides the line defining the opening portions, especially the shearing line.

The present invention is characterized in that the press-forming of the opening portions 2 in the can end 1 is coupled with the operation of applying the sealant to the inside surface of the opening portion into a consecutive integrated operational system. One embodiment of this invention is shown below. Referring to FIG. 4, eight worktables (I) to (VIII) are disposed at equal intervals on the same circumference of an annular base stand 4. The worktable (VIII) is for feeding new can ends; the worktables (I) to (IV) are press-forming worktables; the worktables (V) and (VI) serve as sealant-applying worktables; and the worktable (VII) is for removing finished can ends. FIG. 4 merely shows the general arrangement of the worktables. The general structure of the apparatus used in this invention is shown in FIG. 5. The apparatus comprises a base stand 4 at its bottom, a can end-supporting disc 6 above, and a press member 7 at its top. As is shown in FIG. 7, the can end-supporting disc 6 is annular and has a plurality of holes for supporting can ends. These supporting holes are arranged at the same intervals as the worktables in FIG. 4 on the same circumference. The can end-supporting disc 6 is adapted to rotate intermittently about the same axis as the base stand 4. A drive means is provided in a cavity at the center of the base stand 4.

Figure 8:
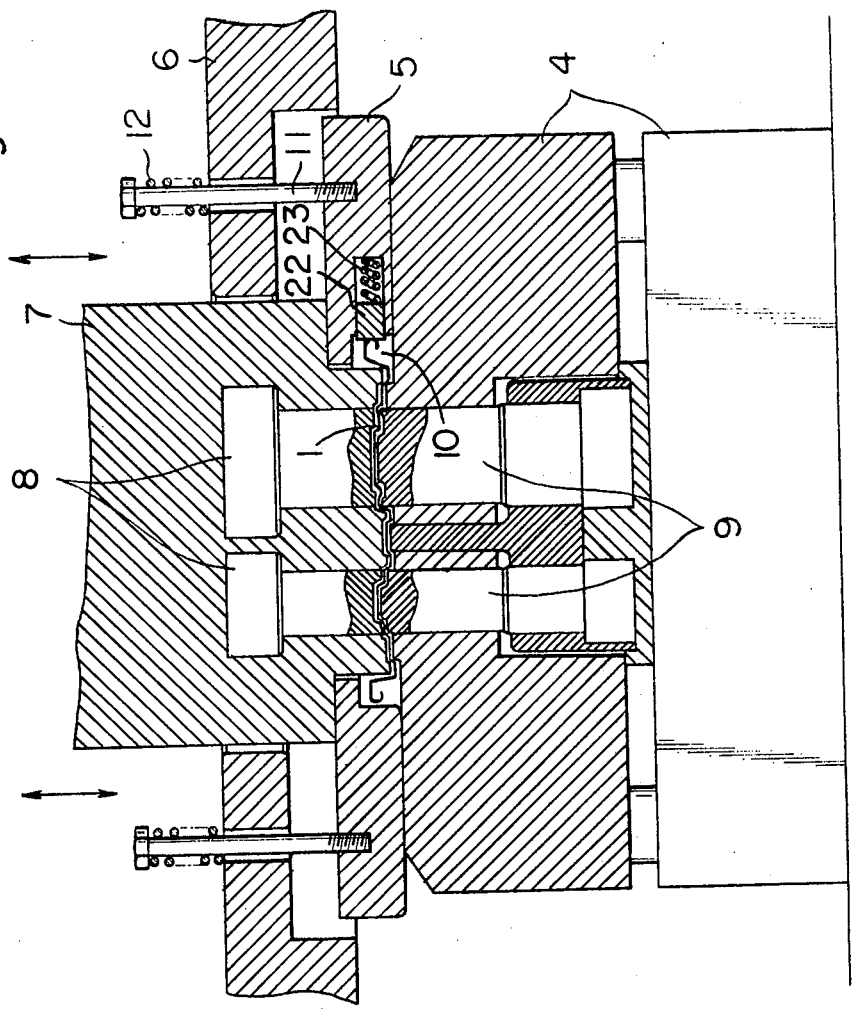
FIG. 8 is a side elevation in vertical section taken along the line X—X of a press worktable (I) shown in FIG. 4.

In order to describe the above combination in greater detail, a side elevation of the worktable (I) taken along the line X—X of FIG. 4 is shown in FIG. 8. FIG. 8 shows that the press member 7 has descended and is pressing the can end 1. The can end 1 is held between male dies 9 and female dies 8 incorporated in the press member 7 so as to form opening portions. The following contrivance is made in the present invention for the lifting of the upper press member 7 after the finishing of the press-forming operation. As is shown in FIG. 8, an auxiliary disc 5 is provided in the can end-supporting disc 6. A circular cavity is formed in the can end-supporting disc 6 so as to receive the auxiliary disc 5 therein. Bolts 11 are screwed in the auxiliary disc 5. The bolts 11 extend through the holes of the can end-supporting disc 6, and are urged against these discs by means of a spring 12. A hole through which the central projection of the upper press member 7 can pass is formed at the center of the auxiliary disc 5. A space 10 provided in the lower half of the above hole supports the flange portion of the can end. Along the outside periphery of the space 10 there are disposed a plurality of conventional can end supporting fingers 22 arranged in circumferentially spaced relation. The supporting fingers 22 combine to support the can end by pressing the flanged portion of the can end radially inwardly by means of a spring 23 associated with each finger. Details of stops, etc. for the fingers 22 are conventional and thus omitted. When the upper press member 7 is lifted in the construction shown in FIG. 8, the auxiliary disc 5 approaches the can end-supporting disc 6 by the elasticity of the spring 12 while supporting, the pressed can end 1, and forms a unitary structure together with it. Simultaneously, the can end 1 departs from the lower male dies 9. Accordingly, when the can end supporting disc 6 rotates subsequently by means of a conventional intermittently actuated drive unit 24, the projection of the base stand 4 does not interrupt this rotation.

As stated above, a can end 1 to be processed is fed first to the press worktable (VIII), and simultaneously with the feeding, the can end needs to be supported by the auxiliary disc 5. This can be accomplished by using a suitable upper press member also on the press worktable (VIII) to allow the flange portion of the can end to be held in the space 10. When the operation in the press-forming worktable (I) has been completed and the upper press member has been lifted, the can end supporting disc 6 is subsequently rotated by the amount corresponding to one worktable. Thus, the can end 1 is transferred to the press worktable (II).

The inside structures of the press worktables (II), (III) and (IV) are much the same as that of the press worktable (I) except for some minor differences in male and female dies. The opening projections formed by these press worktables are shown in FIG. 9. FIGS. 9a through 9e show the progressive formation of openings in ends by the press worktables. The can end of FIG. 9a is formed by press-forming on the worktable (I). The bead A of this end represents a part which becomes an opening portion. In FIG. 9b, the bead portion is cut by press-forming on the worktable (II). FIG. 9c shows an overlapping part formed by collapsing the bead shown by the dotted line and stretching it on the press worktable (III). A recessed portion is formed in the part A by press-forming on the worktable (IV), and the end portions are lifted to reinforce the overlapping portion of the bead. This is shown in FIG. 9d. FIG. 9e shows that a sealant has been applied to the inside surface, especially the overlapping portion, of the opening. The invention is not limited to the press-forming operation for making opening portions as described above. The shape and size of the openings are optional. For example, in the present embodiment, the shape of the opening is rhombic, but other shapes such as a circle, an ellipse or a combination of these are also feasible. The sheared portion or overlapping portion can also be chosen arbitrarily.

In order to describe the application of a sealant, the sealant-applying worktable (V) shown in FIG. 4 is cut along the line Y—Y, and its side elevation is shown in FIG. 10. This figure shows one can end in the separated state, but actually, the can end is supported by the can end supporting disc. The sealant-applying worktable shown in FIG. 10 has the following construction.

An outer side wall 11 includes a chamber 21 for accomodating a sealant, and an inlet port 14 for the sealant. A central hole $15_2$ is formed in the upper part of an inside wall 10 of an outer frame 13, and a central hole $15_1$ is formed in a cover portion 15 of the outer frame 13. A space 16 is formed between the top surface of the inside wall 10 of the outer frame 13 and the undersurface of the cover 15 at its center.

A plunger 17 is provided which is movable up and down along the central holes $15_2$ and $15_1$. The plunger continuously makes an up-and-down movement by a device provided at the lower part. A stamping die 18 is fitted to the top of the plunger 17.

The plunger 17 moves up and down by the up-and-down movement of a lever 20 of the device at the lower part. The lever 20 is connected to a mechanism for the vertical movement of the press member on the press worktable. Accordingly, the press-forming operation on the press worktables is performed synchronously with the plunger 17 of the sealant-applying worktable. In other words, simultaneously with the press-forming operation on the press worktables, the sealant is coated on the can end by the stamping die.

A sealant heated to a flowable state is pushed into the chamber 21 from the inlet port 14 by means of a pump or the like. The composition is extruded from a slit 16 formed at the upper portion of the chamber 21 in the manner shown. The stamping die 18 rises from below to push off the projecting sealant. Since the sealant is of high viscosity, the excessive sealant adheres to the outside of the die 18. The excess of the sealant is removed by the inner walls of the central hole $15_1$, and discharged outside from an exit port separately provided.

The sealant-applying operation illustrated in FIG. 10 refers to one of the two openings 2 (FIGS. 1 and 2), and the other opening 2 may be coated using a sealant-applying worktable situated next to one shown in FIG. 10. The sealant-applying operation using the next worktable is the same as shown in FIG. 10.

Referring to FIG. 4, the embodiment of the present invention will be summarized as follows: A can end having a curled portion for seaming is fed to the worktable (VIII), and pushed into the auxiliary disc 5 by the descending of the upper press member 7 and held there. The auxiliary disc 5 is separably connected to the can end-supporting disc 6. The disc 6 supporting the can end is conventionally rotated intermittently by the drive unit 24. Thus, the can end moves from one worktable to the next, and after movement, stops for a while at each worktable. During the stoppage, the press-forming and coating of the can end are performed. This movement-and-stoppage cycle is repeated. The can end supplied from the worktable (VIII) is press-formed through the worktables (I), (II), (III) and (IV) to form opening portions. Subsequently, the sealant-applying operation is performed on the worktable (V) or (VI) simultaneously with the pressing of the following can ends. The finished can ends are withdrawn from the worktable (VII).

The above method and apparatus of this invention make it possible to produce the desired can ends at a rate of at least 300 pieces per minute.

We claim:

1. A method for press-forming opening portions in a can end and applying a sealant to the opening portions, characterized in that in an apparatus comprising an annular base stand, a plurality of press-forming worktables disposed in a series at predetermined intervals on said base stand, a can end-supporting disc movably provided on said base stand and can end-supporting holes formed in said supporting disc at the same intervals as said press-forming worktables, said can end-supporting disc being adapted to move over said base stand while supporting can ends by said holes, said can end-supporting disc stops for a while when said can end has reached each pressforming worktable, and during the stoppage, the can end is subjected to press-forming; when the press-forming is over and a press member has departed, said can end-supporting disc moves by one interval and the press-forming operation begins at the next press-forming worktable; opening portions are formed on the can end while the can end passes a series of these press-forming worktables; furthermore, worktables for applying a sealant are provided at the same intervals as the press-forming worktables on the extension of the advancing path of said can end-supporting disc; when the can end has reached the top of the sealant-applying worktable, a stamping die provided within the sealant-applying worktable scrapes off the sealant extruded from a slit in the peripheral wall of the sealant-applying worktable, and the sealant is applied to the inside surface of the opening portions of the can end; and in the above coupled operation of press-forming and sealant application, the vertial movement of the stamping die is synchronized with the vertical movement of the press member at the pressforming worktable.

2. An apparatus, characterized in that in an annular base stand having a plurality of worktables disposed thereon at predetermined intervals, one of them being a worktable to which a can end is first to be fed, several following worktables being press-forming worktables, at least one worktable further following the press-forming worktables being a worktable for applying a sealant, and the last one being a worktable from which the finished can end is withdrawn, a vertically movable semi-annular plate is provided above said feeding worktable and press-forming worktables; said semi-annular plate has fitted thereto press members corresponding to the worktables underneath; a female press die corresponding to an opening portion of the can end is provided at the lower end of each of the press members and a male press die meshing with the female press die is provided in each of the worktables underneath; a rotatable can end-supporting disc is fitted over said annular base stand, said supporting disc being annular and having can end-supporting holes disposed at the same intervals as said worktables; said coating worktable located in the advancing direction of the press-forming worktables includes a stamping die and a device for extruding the sealant and supplying it to said stamping die; and said apparatus also includes a device for synchronizing the vertical movement of said stamping die with the vertical movement of the press members above the press-forming worktables and a device for rotating said can end-supporting disc in such a manner that it stops when said two devices are in motion, and moves when they are at halt.

3. The apparatus of claim 2 wherein an auxiliary supporting plate for supporting a can end is used, and connected to said can end-supporting disc by a spring means in such a state that it fits in a recess formed on the underside of said can end-supporting disc.

4. The apparatus of claim 2 wherein the apparatus further includes a device consisting of a vertically movable plunger provided within the sealant-applying worktable, a stamping die fitted to the top of said plunger and means for extruding a sealant onto the stamping die, so that the sealant is applied to the inside surface of the opening portions when the can end on which opening portions have been formed after being processed on the press-forming worktables reaches the sealant-applying worktable.

* * * * *